United States Patent [19]

Kioka et al.

[11] Patent Number: 5,247,031

[45] Date of Patent: Sep. 21, 1993

[54] OLEFIN POLYMERIZATION CATALYST COMPONENT, PROCESS FOR PRODUCTION THEREOF, OLEFIN POLYMERIZATION CATALYST, AND PROCESS FOR POLYMERIZING OLEFINS

[75] Inventors: Mamoru Kioka, Iwakuni; Masao Nakano, Yamaguchi; Akinori Toyota, Iwakuni, all of Japan

[73] Assignee: Mitsui Petrochemical Industries, Ltd., Tokyo, Japan

[21] Appl. No.: 606,628

[22] Filed: Oct. 31, 1990

Related U.S. Application Data

[62] Division of Ser. No. 406,466, Sep. 13, 1989, Pat. No. 4,990,477.

[30] Foreign Application Priority Data

Sep. 13, 1988 [JP] Japan .............................. 63-228955
Sep. 13, 1988 [JP] Japan .............................. 63-228956

[51] Int. Cl.$^5$ .......................... C08F 4/654; C08F 4/651
[52] U.S. Cl. .................................. 526/125; 526/138; 526/348; 526/348.6; 526/904
[58] Field of Search .......................................... 526/125

[56] References Cited

U.S. PATENT DOCUMENTS

| | | | |
|---|---|---|---|
| 3,764,591 | 10/1973 | Miyoshi et al. | 526/138 |
| 4,543,400 | 9/1985 | Wristers | 526/904 |
| 4,556,648 | 12/1985 | Kawai et al. | 526/114 |
| 4,831,090 | 5/1989 | Bachl et al. | 526/138 |
| 4,952,649 | 8/1990 | Kioka et al. | 526/351 |
| 4,990,479 | 2/1991 | Ishimaru et al. | 526/125 |
| 5,028,671 | 7/1991 | Kioka et al. | 526/125 |

*Primary Examiner*—Edward J. Smith
*Attorney, Agent, or Firm*—Sherman and Shalloway

[57] ABSTRACT

A catalyst component (X") obtained by treating an olefin polymerization catalyst (X) formed from (A) a solid titanium catalyst component comprising magnesium, titanium, halogen and an electron donor as essential ingredients, (B) an organoaluminum compound catalyst component, and as required, (C) an electron donor with an alpha-olefin by preliminarily polymerizing the alpha-olefin in an amount of 0.1 to 500 g per gram of the solid titanium catalyst component (A) in the presence of said catalyst (X), and contacting the treated catalyst (X') with at least 0.1 mole, per gram-atom of titanium in the treated catalyst (X'), of oxygen. A process for producing the olefin polymerization catalyst component. A catalyst (Y) for olefin polymerization formed from [I] the above catalyst component (X"), [II] an organoaluminum compound catalyst component and as required [III] an electron donor. Also provided is a process for polymerizing olefins in the presence of the olefin polymerization catalyst (Y).

1 Claim, No Drawings

OLEFIN POLYMERIZATION CATALYST COMPONENT, PROCESS FOR PRODUCTION THEREOF, OLEFIN POLYMERIZATION CATALYST, AND PROCESS FOR POLYMERIZING OLEFINS

This is a division of application Ser. No. 07/406,466, filed Sep. 13, 1989, now U.S. Pat. No. 4,990,477.

BACKGROUND OF THE INVENTION

1. Field of the Invention

This invention relates to a catalyst component for olefin polymerization which can give an olefin polymer, particularly an olefin copolymer in a high yield with a decreased amount of a by-product amorphous polymer, a process for producing the catalyst component, a catalyst for olefin polymerization, and a process for polymerizing olefins in the presence of the catalyst.

Olefin polymers, particularly olefin copolymers produced by using the catalyst component of the present invention have a low proportion of amorphous polymers. Films produced from these olefin polymers or copolymers, therefore, have excellent antiblocking property. As a result, the amount of an antiblocking agent such as silica can be decreased, and a film having excellent transparency can be obtained.

2. Description of the Prior Art

Many proposals have already been made on the method of producing a solid titanium catalyst component comprising magnesium, titanium, halogen and an electron donor as essential ingredients. It is known that the use of this solid titanium catalyst component in the polymerization of alpha-olefins having at least 3 carbon atoms can give highly stereoregular olefin polymers.

However, olefin copolymers obtained by using the solid titanium catalyst components so far proposed contain large amounts of by-product amorphous polymers, and film products prepared from these copolymers have the defect of being inferior in antiblocking property. This necessitated the incorporation of an antiblocking agent such as silica powder in the polymers, and the resulting films tend to have reduced transparency.

SUMMARY OF THE INVENTION

It is an object of this invention to solve the above-described problem of the prior art, and to provide a catalyst component for olefin polymerization which can give an olefin polymer, particularly an olefin copolymer, in a high yield with a decreased amount of a by-product amorphous polymer, a process for producing the catalyst component, a catalyst for olefin polymerization, and a process for polymerizing an olefin in the presence of the catalyst.

Extensive investigations of the present inventors have now led to the discovery that when an alpha olefin is preliminarily polymerized by using an olefin polymerization catalyst formed from (A) a solid titanium catalyst component comprising magnesium, titanium, halogen and an electron donor as essential ingredients, (B) an organoaluminum compound as another catalyst component and as required, (C) an electron donor and then the catalyst subjected to preliminary polymerization is contacted with oxygen, and an olefin is polymerized or copolymerized in the presence of an olefin polymerization catalyst formed from the resulting treated catalyst component, an organoaluminum compound catalyst component and as required, an electron donor, an olefin polymer or copolymer can be obtained in a high yield with a decreased amount of a by-product amorphous polymer.

The above object is achieved in accordance with this invention by a catalyst component (X″) obtained by treating an olefin polymerization catalyst (X) formed from (A) a solid titanium catalyst component comprising magnesium, titanium, halogen and an electron donor as essential ingredients, (B) an organoaluminum compound catalyst component, and as required, (C) an electron donor with an alpha-olefin by preliminarily polymerizing the alpha-olefin in an amount of 0.1 to 500 g per gram of the solid titanium catalyst component (A) in the presence of said catalyst (X), and contacting the treated catalyst (X′) with at least 0.1 mole, per gram-atom of titanium in the treated catalyst (X′), of oxygen.

In accordance with this invention, the above object is also achieved by a process for producing the catalyst component (X″) for olefin polymerization, which comprises treating an olefin polymerization catalyst (X) formed from (A) a solid titanium catalyst component comprising magnesium, titanium, halogen and an electron donor as essential ingredients, (B) an organoaluminum compound catalyst component, and as required, (C) an electron donor with an alpha-olefin by preliminarily polymerizing the alphaolefin in an amount of 0.1 to 500 g per gram of the solid titanium catalyst component (A) in the presence of said catalyst (X), and thereafter contacting the treated catalyst (X′) with at least 0.1 mole, per gram-atom of titanium in the treated catalyst (X′), of oxygen.

The above object is also achieved in accordance with this invention by a catalyst for olefin polymerization (Y) formed from

[I] a catalyst component (X″) obtained by treating an olefin polymerization catalyst (X) formed from (A) a solid titanium catalyst component comprising magnesium, titanium, halogen and an electron donor as essential ingredients, (B) an organoaluminum compound catalyst component, and as required, (C) an electron donor with an alpha-olefin by preliminarily polymerizing the alpha-olaefin in an amount of 0.1 to 500 g per gram of the solid titanium catalyst component (A) in the presence of said catalyst (X), and contacting the treated catalyst (X′) with at least 0.1 mole, per gram-atom of titanium in the treated catalyst (X′), of oxygen,

[II] an organoaluminum compound catalyst component, and as required,

[III] an electron donbor.

The above object is further achieved in accordance with this invention by a process for polymerizing olefins, which comprises polymerizing or copolymerizing olefins in the presence of an olefin polymerization catalyst formed from

[I] a catalyst component (X″) obtained by treating an olefin polymerization catalyst (X) formed from (A) a solid titanium catalyst component comprising magnesium, titanium, halogen and an electron donor as essential ingredients, (B) an organoaluminum compound catalyst component, and as required, (C) an electron donor with an alpha-olefin by preliminarily polymerizing the alpha-olefin in an amount of 0.1 to 500 g per gram of the solid titanium catalyst component (A) in the presence of said cayalyst (X), and contacting the treated catalyst (X′) with at least 0.1 mole, per gram-atom of titanium in the treated catalyst (X′), of oxygen,

[II] an organoaluminum compound catalyst component, and as required,

[III] an electron donor.

DETAILED DESCRIPTION OF THE PREFERRED EMBODIMENTS

The olefin polymerization catalyst component (X″), the process for its production, the olefin polymerization catalyst (Y), and the process for polymerizing olefins using the catalyst (Y) will now be described in detail.

The term "polymerization" in this invention may sometimes be used to mean both homopolymerization and copolymerization. The term "polymer" may likewise be used to mean both a homopolymer and a copolymer.

It should be understood that for the purpose of the invention, the term "alpha-olefin" embraces ethylene as well.

The olefin polymerization catalyst component (X″) of this invention is a catalyst obtained by treating a polymerization catalyst (X) formed from (A) a solid titanium catalyst component comprising magnesium, titanium, halogen and an electron donor as essential ingredients, (B) an organoaluminum compound catalyst component, and as required, (C) an electron donor with an alpha-olefin by preliminarily polymerizing the alpha-olefin in the presence of the catalyst (X), and then contacting the used catalyst (X) with oxygen.

The amount of the alpha-olefin preliminarily polymerized in the presence of the catalyst (X′) is 0.1 to 500 g, preferably about 0.3 to 300 g, especially preferably 1 to 100 g, per gram of the solid titanium catalyst component (A).

The amount of oxygen contacted with the treated catalyst (X′) is at least 0.1 mole, preferably 0.1 to 100 moles, more preferably 0.2 to 10 moles, especially preferably 0.3 to 3 moles, per gram-atom of titanium in the treated catalyst (X′)

The olefin polymerization catalyst (Y) of this invention is formed from [I] the olefin polymerization catalyst (X″), [II] an organoaluminum compound, and as required, [III] an electron donor. The individual components will be described below.

The olefin polymerization catalyst (X) used in preparing the the olefin polymerization catalyst component [I] (X″) in this invention is formed from the solid titanium catalyst component (A), the organoaluminum compound catalyst component (B) and as required, the electron donor (C).

The solid titanium catalyst component (A) is a highly active catalyst component comprising magnesium, titanium, halogen and an electron donor as essential ingredients.

The solid titanium catalyst component (A) can be prepared by contacting a magnesium compound, a titanium compound and an electron donor to be described.

The titanium compound used in the preparation of the solid titanium catalyst component (A) in this invention may be, for example, a tetravalent titanium compound represented by $Ti(OR)_gX_{4-g}$ in which R represents a hydrocarbon group, X represents a halogen atom and g is a number from 0 to 4. Specific examples of the tetravalent titanium compound include:

titanium tetrahalides such as $TiCl_4$, $TiBr_4$ and $TiI_4$;

alkoxy titanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(Oiso-C_4H_9)Br_3$;

dialkoxy titanium dihalides such as $Ti(OCH_3)_2Cl_2$, $Ti(OC_2H_5)_2Cl_2$, $Ti(On-C_4H_9)_2Cl_2$ and $Ti(OC_2H_5)_2Br_2$;

trialkoxy titanium monohalides such as $Ti(OCH_3)_3Cl$, $Ti(OC_2H_5)_3Cl$, $Ti(On-C_4H_9)_3$ and $Ti(OC_2H_5)_3Br$; and tetraalkoxy titaniums such as $Ti(OCH_3)_4$, $Ti(OC_2H_5)_4$, $Ti(On-C_4H_9)_4$, $Ti(Oiso-C_4H_9)_4$ and $Ti(2-ethylhexyloxy)_4$.

Of these, the halogen-containing titanium compounds, especially titanium tetrahalides, are preferred. Titanium tetrachloride is most suitable. These titanium compounds may be used singly, or in combination with each other. If desired, the titanium compounds may be diluted with hydrocarbon compounds or halogenated hydrocarbon compounds.

Magnesium compounds having reducibility and magnesium compounds having no reducibiity may be used as the magnesium compound in the preparation of the solid titanium catalyst component (A) in this invention.

The magnesium compounds having reducibility may be, for example, magnesium compounds having a magnesium-carbon bond or a magnesium-hydrogen bond. Specific examples of the magnesium compounds having reducibility include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, octylbutylmagnesium, and butylmagnesium hydride. These magnesium compounds may be used singly, or may form complex compounds with the organoaluminum compounds to be described. These magnesium compounds may be liquid or solid.

Specific examples of the magnesium compounds having no reducibility include magnesium halides such as magnesium chloride, magnesium bromide, magnesium iodide and magnesium fluoride;

alkoxy magnesium halides such as methoxy magnesium chloride, ethoxy magnesium chloride, isopropoxy magnesium chloride, butoxy magnesium chloride and octoxy magnesium chloride;

aryloxy magnesium halides such as phenoxy magnesium chloride and methylphenoxy magnesium chloride;

alkoxymagnesiums such as ethoxymagnesium, isopropoxymagnesium, butoxymagnesium, n-octoxymagnesium and 2-ethylhexoxymagnesium;

aryloxymagnesiums such as phenoxymagnesium and dimethylphenoxymagnesium; and magnesium carboxylates such as magnesium laurate and magnesium stearate.

These magnesium compounds having no reducibility may be compounds derived from the magnesium compounds having reducibility or compounds derived at the time of preparing catalyst components. For example, the magnesium compounds having no reducibility may be derived from magnesium compounds having no reducibility by contacting the magnesium compounds having reducibility with polysiloxane compounds, halogen-containing silane compounds, halogen-containing aluminum compounds, esters, alcohols, etc. The magnesium compounds that can be used in this invention may also be complexes of the above magnesium compounds having reducibility or having no reducibility with other metals, or mixtures of the magnesium compounds with other metal compounds, or may be mixtures of two or more of the above magnesium compounds.

Among the above magnesium compounds, the magnesium compounds having no reducibility are preferred in this invention. Halogen-containing magnesium compounds are particularly preferred. Especially preferred among them are magnesium chloride, alkoxy magnesium chlorides and aryloxy magnesium chlorides.

The electron donor used in the preparation of the solid titanium catalyst component (A) in this invention may be, for example, an ester of a polyfunctional compound such as a polycarboxylic acid ester or a carboxylic acid ester of a polyhydric alcohol. Specific examples are compounds having the skeletons of the following formulae. Of these polyfunctional compound ester, the polycarboxylic acid esters are preferred.

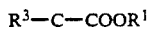
$R^3—C—COOR^1$

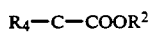
$R_4—C—COOR^2$

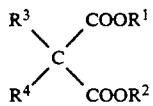
$$\begin{matrix} R^3 & & COOR^1 \\ & \diagdown \diagup & \\ & C & \\ & \diagup \diagdown & \\ R^4 & & COOR^2 \end{matrix}$$

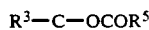
$R^3—C—OCOR^5$

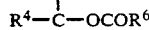
$R^4—C—OCOR^6$

In the above formulae, $R^1$ represents a substituted or unsubstituted hydrocarbon group; $R^2$, $R^5$ and $R^6$ each represent a hydrogen atom or a substituted or unsubstituted hydrocarbon group; and $R^3$ and $R^4$ each represent a hydrogen atom or a substituted or unsubstituted hydrocarbon group; and ⎯⎯ represents a single or a double bond. $R^3$ and $R^4$ be linked to each other to form a cyclic structure. Preferably, at least one of $R^3$ and $R^4$ is a substituted or unsubstituted hydrocarbon group. The substituted hydrocarbon group may be a substituted hydrocarbon group containing a hetero atom such as N, O and S, for example, a substituted hydrocarbon group having such a structure as —C—O—C—, —COOR, —COOH, —OH, —SO₃H, —C—N—C— and —NH₂. Diesters derived from dicarboxylic acids in which at least one of $R^1$ and $R^2$ represents an alkyl group having at least 2 carbon atoms are preferred.

Specific examples of the polycarboxylic acid esters include aliphatic polycarboxylic acid esters such as diethyl succinate, dibutyl succinate, diethyl methylsuccinate, diisobutyl alpha-methylglutarate, dimethyl malonate, diethyl malonate, diethyl ethylmalonate, diethyl isopropylmalonate, diethyl butylmalonate, diethyl phenylmalonate, diethyl diethylmalonate, diethyl allylbutylmalonate, dimethyl maleate, monooctyl maleate, diisooctyl maleate, diisobutyl maleate, diisobutyl butylmaleate, diethyl butylmaleate, diisopropyl beta-methylglutarate, diallyl ethylsuccinate, di-2-ethylhexyl fumarate, diethyl itaconate, diisobutyl itaconate, diisooctyl citraconate and dimethyl citraconate;

alicyclic polycarboxylic acid esters such as diethyl 1,2-cyclohexanecarboxylate, diisobutyl 1,2-cyclohexanecarboxylate, diethyl tetrahydrophthalate and diethyl bicyclo[2.2.1]heptene-2,3-dicarboxylate; aromatic polycarboxylic acid esters such as monoethyl phthalate, dimethyl phthalate, methylethyl phthalate, monoisobutyl phthalate, diethyl phthalate, ethyl isobutyl phthalate, mono-n-butyl phthalate, ethyl n-butyl phthalate, di-n-propyl phthalate, diisopropyl phthalate, di-n-butyl phthalate, diisobutyl phthalate, di-n-heptyl phthalate, di-2-ethylhexyl phthalate, didecyl phthalate, benzylbutyl phthalate, diphenyl phthalate, diethyl naphthalenedicarboxylate, dibutyl naphthalenedicarboxylate, triethyl trimellitatte and dibutyl trimellitate; and esters derived from heterocyclic polycarboxylic acids such as 3,4-furanedicarboxylic acid.

Other examples of the polycarboxylic acid esters include esters derived from long-chain dicarboxylic acids such as diethyl adipate, diisobutyl adipate, diisopropyl sebacate, di-n-butyl sebacate, n-octyl sebacate and di-2-ethylhexyl sebacate. Of these, polycarboxylic acid esters having the skeletons represented by the general formulae given above are preferred. Esters derived from phthalic acid, maleic acid or substituted malonic acid and alcohols having at least 2 carbon atoms are preferred. Esters derived from phthalic acid and alcohols having at least 2 carbon atoms are especially preferred.

It is not always necessary to use the above polycarboxylic acid esters as a starting material for the preparation of the solid titanium catalyst component (A). It is possible to use compounds capable being converted to these polycarboxylic acid esters in the step of producing the solid titanium catalyst component (A) and to form the polycarboxylic acid ester in the step of producing the solid titanium catalyst component (A).

Examples of other electron donor that can be used in the preparation of the solid titanium catalyst component (A) in this invention include alcohols, amines, amides, ethers, ketones, nitriles, phosphines, stibines, arsines, phosphoramides, esters, thioethers, thioesters, acid anhydrdes, acid halides, aldehydes, alcoholates, organic silicon compounds such as alkoxy (aryloxy)silanes, organic acids and amides or salts of metals belonging to Group I to Group IV of the periodic table.

As stated above, the solid titanium catalyst commponent (A) can be produced by contacting the magnesium compound (or metallic magnesium), the electron donor and the titanium compound by known methods, optionally in the presence of other reaction reagents such as silicon, phosphorus or aluminum.

Several examples of the method of producing the solid titanium catalyst component (A) will be briefly described below.

(1) The magnesium compound or a complex of the magnesium compound with the electron donor, and the titanium compound are reacted in the liquid phase. This reaction may be carried out in the presence of a pulverization aid. In the above reaction, a solid compound may be pulverized. Furthermore, in the above reaction, each ingreident may be pre-treated with the electron donor and/or a reaction aid such as an organoaluminum compound or a halogen-containing silicon compound. In this method, the electron donor is used at least once.

(2) A liquid magnesium compound having no reducibility and a liquid titanium compound are reacted in the presence of the electron donor to precipitate a solid titanium complex.

(3) The titanium compound is further reacted with the reaction product obtained in (2).

(4) The electron donor and the titanium compound are further reacted with the reaction product obtained in (1) or (2).

(5) A solid material obtained by pulverizing the magnesium compound or a complex of the magnesium compound with the electron donor in the presence of the titanium compound is treated with any of halogen, a halogen compound and an aromatic hydrocarbon. In this method, the magnesium compound or the complex of the magnesium compound and the electron donor may be pulverized in the presence of a pulverization aid. It is also possible to pulverize the magnesium compound or the complex of the magnesium compound and the electron donor in the presence of the titanium compound, treat the pulverization product preliminarily with a reaction aid and then treat the product further with halogen. The reaction aid may be, for example, an organoaluminum compound or a halogen-containing silicon compound In this method, the electron donor is used at least once.

(6) The compound obtained in (1), (2), (3) or (4) is treated with halogen, a halogen compound, or an aromatic hydrocarbon.

(7) A contact reaction product of a metal oxide, dihydrocarbyl magnesium and a halogen-containing alcohol is contacted with the electron donor and the titanium compound (8) A magnesium compound such as a magnesium salt of an organic acid, an alkoxymagnesium or an aryloxymagnesium is reacted with the electron donor, the titanium compound and/or a halogen-containing hydrocarbon.

(9) A hydrocarbon solution of the magnesium compound and an alkoxytitanium and optionally comprising an electron donor such as an alcohol or an ether is reacted with the titanium compound and/or a halogen-containing compound such as a halogen-containing silicon compound. Any one of the steps is carried out in the presence of an electron donor typified by a diphthalate.

Preferred among the methods (1) to (9) cited above are those in which a liquid titanium halide is used, or a halogenated hydrocarbon is used after or during the use of the titanium compound The amounts of the components used in the preparation of the liquid titanium catalyst component (A) cannot be generalized because they may vary according to the method of preparation For example, the amount of the electron donor is about 0.01 to 5 moles, preferably 0.05 to 2 moles, per mole of the magnesium compound, and the amount of the titanium compound is about 0.01 to 500 moles, preferably 0.05 to 300 moles, per mole of the magnesium compound.

The solid titanium catalyst component (A) obtained as above contains magnesium, titanium, halogen and the electron donor as essential ingredients.

Desirably, in the catalyst component (A), the halogen/titanium atomic ratio is about 4 to 200, preferably about 5 to 100; the electron donor/titanium mole ratio is about 0.1 to 10, preferably about 0.2 to about and the magnesium/titanium atomic ratio is about 1 to 100, preferably about 2 to 50.

In comparison with a commercial magnesium halide, the solid titanium catalyst component (A) contains magnesium halide of a small crystal size, and usually has a specific surface area of at least about 50 m$^2$/g, preferably about 60 to 1000 m$^2$/g, more preferably about 100 to 800 m$^2$/g. Since the above ingredients integrally form the solid catalyst component (A), its composition does not substantially change even when it is washed with hexane.

The solid titanium catalyst component (A) may be used singly, or after it is diluted with an organic or an inorganic compound, such as a silicon compound, an aluminum compound or a polyolefin. When the diluent is used, the component (A) show higher catalytic activity even when its specific surface area is lower than that shown above.

Methods of preparing the highly active titanium catalyst component are disclosed, for example, in Japanese Laid-Open Patent Publications Nos. 108385/1975, 126590/1975, 20297/1976, 28189/1976, 64586/1976, 92885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1983, 138706/1983, 138707/1983, 138703/1983, 138709/1983, 138710/1983, 138715/1983, 23404/1985, 21109/1986, 37802/1986 and 37803/1986.

Compounds having at least one Al-C bond in the molecule can be used as the organoaluminum compound catalyst component (B). Examples of these compounds include the following.

(i) Organoaluminum compounds represented by the general formula $$R_m^1 Al(OR^2)_n H_p X_q$$

wherein $R^1$ and $R^2$ are identical or different and each represents a hydrocarbon group usually containing 1 to 15 carbon atoms, preferably 1 to 4 carbon atoms, X represents a halogen atom, $0 < m \leq 3$, $n \leq n < 3$, $0 \leq p < 3$, $q \leq p < 3$, and $m+n+p+q=3$.

(ii) Complex alkylated compounds of Group I metals and aluminum represented by the following general formula.

$$M^1 AlR_4^1$$

wherein M' in Li, Na or K and $R^1$ is as defined.

The following compounds may be cited as examples of the organoaluminum compounds (i).

General formula $R^1_m Al(OR^2)_{3-m}$ wherein $R^1$ and $R^2$ are as defined, and m is preferably from 1.5 to 3.

General formula $R^1_m AlX_{3-m}$ wherein $R^1$ is as defined, X is halogen and m is preferably $0 < m < 3$.

General formula $R^1_m AlH_{3-m}$ wherein $R^1$ is as defined, and m is preferably $2 \leq m < 3$.

General formula $R^1_m Al(OR^2)_n X_q$ wherein $R^1$ and $R^2$ are as defined, X is halogen, $0 < m \leq 3$, $0 \leq n < 3$, $0 \leq q < 3$, and $m + +q = 3$.

Specific examples of the aluminum compounds (i) include trialkyl aluminums such as triethyl aluminum and tributyl aluminum;

trialkenyl aluminum such as triisoprenyl aluminum;

dialkyl aluminum alkoxides such as diethyl aluminum ethoxide and dibutyl aluminum butoxide;

alkyl aluminum sesquialkoxides such as ethyl aluminum sesquiethoxide and butyl aluminum sesquibutoxide;

partially alkoxylated alkyl aluminums having an average composition expressed by $R_{1.5}^1 Al(OR^2)_{0.5}$;

dialkyl aluminum halides such as diethyl aluminum chloride, dibutyl aluminum chloride and diethyl aluminum bromide;

alkyl aluminum sesquihalides such as ethyl aluminum sesquichloride, butyl aluminum sesquichloride and ethyl aluminum sesquibromide;

partially halogenated alkyl aluminums, for example alkyl aluminum dihalides such as ethyl aluminum dichloride, propyl aluminum dichloride and butyl aluminum dibromides;

dialkyl aluminum hydrides such as diethyl aluminum hydride and dibutyl aluminum hydride; and partially alkoxylated and halogenated alkyl aluminums such as ethyl aluminum ethoxychloride, butyl aluminum butoxychloride and ethyl aluminum ethoxybromide.

As compounds similar to those in (i), there can be mentioned organoaluminum compounds in which two or more aluminum atoms are bonded through an oxygen or nitrogen atom. Specific examples are $(C_2H_5)_2AlOAl(C_2H_5)_2$, $(C_4H_9)_2AlOAl(C_4H_9)_2$,

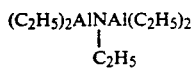

and methylaluminoxanes.

Examples of the compounds (ii) are $LiAl(C_2H_5)_4$ and $LiAl(C_7H_{15})_4$.

The electron donor (C) may be used, as required, in producing the olefin polymerization catalyst component (X) in this invention. The electron donor (C) may include, for example, oxygen-containing electron donors such as alcohols, phenols, ketones, aldehydes, carboxylic acids, esters of organic acids or inorganic acids, ethers, acid amides, acid anhydrides and alkoxysilanes, nitrogen-containing electron donors such as ammonia, amines, nitriles and isocyanates, and polycarboxylic acid esters such as those descrbed above. Specific examples include alcohols having 1 to 18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol, amyl alcohol and isopropylbenzyl alcohol;

phenols having 6 to 20 carbon atoms which may have a lower alkyl group, such as phenol, cresol, xylenol, ethylphenol, proylphenol, nonylphenol, cumylphenol and naphthol;

ketones having 3 to 15 carbon atoms such as acetone, methyl ethyl ketone, methyl isobutyl ketone, acetophenone, benzophenone and benzoquinone;

aldehydes having 2 to 15 carbon atoms such as acetaldehyde, propionaldehyde, octylaldehyde, benzaldehyde, tolualdehyde and naphthoaldehyde;

organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylvbenzoate, methyl anisate, n-butyl maleate, diisobutyl methylmalonate, di-n-hexyl cyclohexenecarbonate, diethyl bicyclo[2.2.1]heptene-2,3-dicarboxylate, diisopropyl tetrahydrophthalate, diethyl phthalate, diisobutyl phthalate, di-n-butyl phthalate, di-2-ethylhexyl phthalate, gamma-butyrolactone, delta-valerolactone, coumarine, phthalide and ethylene carbonate;

acid halides having 2 to 15 carbon atoms such as acetyl chloride, benzoyl chloride, toluoyl chloride and anisoyl chloride;

ethers or diethers having 2 to 20 carbon atoms such as methyl ether, ethyl ether, isopropyl ether, butyl ether, amyl ether, tetrahydrofuran, anisole, diphenyl ether and epoxy-p-menthane;

acid amides such as acetamide, benzamide and toluamide;

amines such as methylamine, ethylamine, diethylamine, tributylamine, piperidine, tribenzylamine, aniline, pyridine, picoline and tetramethylenediamine;

nitriles such as acetonitrile, benzonitrile and tolunitrile; and acid anhydrides such as acetic anhydride, phthalic anhydride and benzoic anhydride.

Organic silicon compounds of the folllowing general formula [Ia]

$$R_nSi(OR')_{4-n} \qquad [Ia]$$

wherein R and R' are hydrocarbon groups, and $0<n<4$, may also be used as the electron donor (C).

Specific examples of the organic silicon compounds of general formula [Ia] include
trimethylmethoxysilane,
trimethylethoxysilane,
dimethyldimethoxysilane,
dimethyldiethoxysilane,
diisopropyldimethoxysilane,
t-butylmethyldimethoxysilane,
t-butylmethyldiethoxysilane,
t-amylmethyldiethoxysilane,
diphenyldimethoxysilane,
phenylmethyldimethoxysilane,
diphenyldiethoxysilane,
bis-o-tolyldimethoxysilane,
bis-m-tolyldimethoxysilane,
bis-p-tolyldimethoxysilane,
bis-p-tolyldiethoxysilane,
bisethylphenyldimethoxysilane,
dicyclohexyldimethoxysilane,
cyclohexylmethyldimethoxysilane,
cyclohexylmethyldiethoxysilane,
ethyltrimethoxysilane,
ethyltriethoxysilane,
vinyltrimethoxysilane,
methyltrimethoxysilane,
n-propyltriethoxysilane,
n-propyltriethoxysilane,
decyltrimethoxysilane,
decyltriethoxysilane,
phenyltrimethoxysilane,
epsilon-chloropropyltrimethoxysilane,
methyltriethoxysilane,
ethyltriethoxysilane,
vinyltriethoxysilane,
t-butyltriethoxysilane,
n-butyltriethoxysilane,
isobutyltriethoxysilane,
phenyltriethoxysilane,
gamma-aminopropyltriethoxysilane,
chlorotriethoxysilane,
ethyltriisopropoxysilane,
vinyltributoxysilane,
cyclohexyltrimethoxysilane,
cyclohexyltriethoxysilane,
2-norbornanetrimethoxysilane,
2-norebornanetriethoxysilaen,
2-norbornanemethyldimethoxysilane,
ethyl silicate,
butyl silicate, trimethylphenoxysilane,
methyltriallyloxysilane,
vinyltris(beta-methoxyethoxy)silane,
vinyltriacetoxysilane, and
dimethyltetraethoxydisiloxane.

Among these, ethyltriethoxysilane,, n-propyltriethoxysilane, t-butyltriethoxysilane, vinyltrethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane are preferred.

Organic silicon compounds represented by the following general formula [IIa] may also be used as the electron donor (C).

$$SiR^1_m R^2_m (OR^3)_{3-m} \qquad [IIa]$$

wherein $R^1$ represents a cyclopentyl group or an alkyl-containing cyclopentyl group, $R^2$ is selected from the group consisting of alkyl groups, a cyclopenty and alkyl-containing cyclopentyl groups, $R^3$ is a hydrocarbon group, and m is $0 \leq m < \leq 2$.

In general formula [IIa], Examples of the alkyl-containing cyclopentyl groups are 2-methylcyclopentyl, 3-methylcyclopentyl, 2-ethylcyclopentyl and 2,3-dimethylcyclopentyl groups.

In formula [IIa], $R^2$ represents an alkyl group, a cyclopentyl group or an alkyl-containing cyclopentyl group. Examples of $R^2$ are alkyl groups such as methyl, ethyl, propyl, isopropyl, butyl and hexyl groups, the cyclopentyl groups and the same alkyl-containing cyclopentyl groups as exemplified above.

Furthermore, in formula [IIa], examples of $R^3$ are alkyl, cycloalkyl, aryl and aralkyl groups. Preferred organic silicon compounds of formula [IIa] are those in which $R^1$ is a cyclopentyl group, $R^2$ is an alkyl or cyclopentyl group and $R^3$ is an alkyl group, particularly a methyl or ethyl group.

Specific organic silicon compounds of formula [IIa] include trialkoxysilanes such as cyclopentyltrimethoxysilane, 2-methylcyclopentyltrimethoxysilane, 2,3-dimethylcyclopentyltrimethoxysilane and cyclopentyltriethoxysilane;

dialkoxysilanes such as dicyclopentyldimethoxysilane, bis(2-methylcyclopentyl)dimethoxysilane, bis(2,3-dimethylcyclopentyl)dimethoxysilane and dicyclopentyldiethoxysilane; and monoalkoxysilanes such as tricyclopentylmethoxysilane, tricyclopentylethoxysilane, dicyclopentylethylmethoxysilane, dicyclopentylethylmethoxsilane, dicyclopentylmethylethoxysilane, cyclopentyldimethylmethoxysilane, cyclopentyldiethylmethoxysilane and cyclopentyldimethylethoxysilane.

Among these electron donors, the organic carboxylic acid esters and the organic silicon compounds are preferred, the latter being especially preferred. The olefin polymerization catalyst (Y) of this invention can be prepared by the following procedure. The olefin polymerization catalyst (X) composed of the solid titanium catalyst component (A), the organoaluminum compound catalyst component (B) and as required, the electron donor is first treated by preliminarily polymerizing an alpha-olefin in the presence of the catalyst (X). The amount of the olefin preliminarily polymerized at this time is 0.3 to 300 g, especially preferably 1 to 100 g, especially preferably 1 to 100 g, per gram of the solid titanium catalyst component (A) constituting the catalyst (X).

In the preliminary polymerization, the catalyst may be used in a higher concentration than the concentration of the catalyst in the main polymerization system.

Desirably, the concentration of the solid titanium catalyst component (A) in the preliminary polymerization is usually about 0.01 to 200 millimoles, preferably about 0.1 to 100 millimoles, especially preferably 1 to 50 millimoles, calculated as titanium, per liter of an inert hydrocarbon medium to be described.

The suitable amount of the organoaluminum catalyst component (B) may be such that per gram of the solid titanium catalyst component (A), 1 to 500 g, preferably 0.3 to 3000 g, of a polymer is formed. Desirably, it is usually about 0.1 to 100 moles, preferably about 0.5 to 50 moles, especially preferably 1 to 20 moles, per mole of titanium in the solid titanium catalyst component.

The amount of the electron donor (C) which is optionally used is 0.1 to 50 moles, preferably 0.5 to 30 moles, especially preferably 1 to 10 moles, per mole of titanium atom in the sold titanium catalyst component (A). Preferably, the preliminary polymerization is carried out under mild conditions after the olefin and the catalyst (X) are added to the inert hydrocarbon medium.

Examples of the inert hydrocarbon medium used in the preliminary polymerization include aliphatic hydrocarbons such as propane, butane, pentane, hexane, heptane, octane, decane, dodecane and kerosene;

alicyclic hydrocarbons such as cyclopentane, cyclohexane and methylcyclopentane;

aromatic hydrocarbons such as benzene, toluene and xylene;

halogenated hydrocarbons such as ethylene chloride and chlorobenzene; and mixtures of these hydrocarbons.

The aliphatic hydrocarbons are especially preferred. The olefin itself may also be used as a solvent, or the preliminary polymerization may be carried out in the substantial absence of a solvent.

The olefin used in the preliminary polymerization may be identical with, or different from, the olefin to be used in the main polymerization.

Desirably, the reaction temperature in the preliminary polymerization is usually about $-20°$ to $+100°$ C., preferably about $-20°$ to $+80°$ C., preferably $0°$ to $+40°$ C.

In the preliminary polymerization, a molecular weight controlling agent such as hydrogen may be used. Desirably, the molecular weight controlling agent is used in such an amount that the polymer obtained by the preliminary polymerization has an intrinsic viscosity $[\eta]$, determined in decalin at $135°$ C., of at least about 0.2 dl/g, preferably about 0.5 to 10 dl/g.

Desirably, the preliminary polymerization is carried out so that per gram of the titanium catalyst component (A), a polymer is formed in an amount of about 0.1 to 500 g, preferably about 0.3 to 300 g, especially preferably 1 to 100 g. If the amount of the polymer formed in the preliminary polymerization is too large, the production efficiency of the olefin polymer may sometimes decrease.

The preliminary polymerization may be carried out batchwise or continuously. In the present invention, the catalyst (X) subjected to the preliminary polymerization of the olfein as above is contacted with oxygen.

Specifically, the contracting of the treated catalyst (X') is carried out in the following manner.

The catalyst (X') subjected to preliminary polymerization is preferably contacted with at least 0.1 mole, preferably 0.1 to 100 moles, more preferably 0.2 to 10 moles, especially preferably 0.3 to 3 moles, of oxygen per gram-atom of Ti in the catalyst (X').

The contacting of the treated catalyst (X') with oxygen is carried out at a temperature of $-30°$ to 100° C., preferably 0° to 40° C., for a period of 1 minute to 100 hours, preferably 10 minutes to 10 hours.

It is presumed that as a result of contacting the catalyst (X') with oxygen, Ti in the catalyst component (X'') combines with oxygen.

The main polymerization of an olefin is carried out in the presence of an olefin polymerization catalyst (Y) formed from the resulting olefin polymerization catalyst component [I] (i.e., X'') obtained by the preliminary polymerization and treatment with oxygen, [II] an organoaluminum catalyst component and as required [III] an electron donor.

In the main polymerization of the olefin, the organoaluminum compound [II] may be the same as the organoaluminum compound (B) used to produce the olefin polymerization catalyst component. Furthermore, the electron donor [III] may be the same as the electron donor (C) used to produce the olefin polymerization catalyst component of the invention. It should be noted that the organoaluminum compound and the electron donor used in the main polymerization of olefins do not have to be identical with the organoaluminum compound and the electron donor used in the preparation of the olefin polymerization catalyst component (X'') of this invention.

Olefins having 2 to 20 carbon atoms such as ethylene, propylene, 1-butene, 4-methyl-1-pentene and 1-octene may be used in the main polymerization. In the polymerization process of this invention, these olefins may be used singly or in combination with each other. Preferably, a mixture of olefins containing propylene or 1-butene as a main component is copolymerized. Particularly, the copolymerization of propylene with ethylene and/or 1-butene, or the copolymerization of 1-butene with ethylene, is preferred. In the mixture of olefins, the preferred proportion of propylene or 1-butene as a main component is usually at least 50 mole %, preferably at least 70 mole %.

In performing the homopolymerization or copolymerization of these olefins, polyunsaturated compounds such as conjugated dienes or non-conjugated dienes may be used as polymerization materials.

In the polymerization process of this invention, the polymerization of olefins is carried out usually in the gaseous phase or liquid phase.

When the main polymerization is carried out in a slurry polymerization mode, the above inert hydrocarbon or an olefin which is liquid at the reaction temperature may be used as a reaction solvent.

In the polymerization process of this invention, the olefin polymerization catalyst component [I] (X'') subjected to preliminary polymerization and oxygen treatment may be used in an amount of usually 0.001 to 0.5 millimoles, preferably about 0.005 to 0.1 millimoles, calculated as Ti per liter of the volume of the polymerization system. The organoaluminum compound catalyst component [II] is used in such an amount that the proportion of the metal atom in the organoaluminum compound is usually about 1 to 2,000 moles, preferably about 5 to 500 moles, per mole of the titanium atom in the treated catalyst (X'') in the polymerization system. The electron donor is used in an amount of usually about 0.001 to 10 moles, preferably about 0.01 to 2 moles, especially about 0.05 to 1 mole, per mole of the metal atom in the organoaluminum compound catalyst component [II].

The use of hydrogen in the main polymerization permits adjustment of the molecular weight of the resulting polymer, and a polymer having a high melt flow rate can be obtained.

In the present invention, the olefin polymerization temperature is prescribed usually at about 20° to 200° C. preferably about 50° to 100° C., and the pressure is prescribed usually at atmospheric pressure to 100 kg/cm$^2$, preferably about 2 to 50 kg/cm$^2$. In the process of this invention, the polymerization may be carried out batchwise, semi-continuously, or continuously. It is also possible to perform the polymerization in two more more stages under varied reaction conditions.

The olefin polymer so obtained may be a homopolymer, or a copolymer (e.g.,) a random copolymer or a blocked copolymer.

Method of measuring the amount of a component solubler in n-decane at 23° C.: An n-decane (500 ml) solution of polymer particles (3 g) is heated at 140° to 145° C. with stirring. The stirring is stopped, and the solution is cooled to 80° C. over 3 hours, and to 23° C. over 5 hours. It is further maintained at 23° C. for 5 hours. The solution is then filtered through a G-4 glass filter, and n-decane is removed from the filtrate. The remaining solid is regarded as a component (X g) soluble in n-decane at 23° C. The amount of a component soluble in n-decane at 23° C. is calculated as $X/3 \times 100$ (% by weight).

When olefins are polymerized, particularly copolymerized by using the olefin polymerization catalyst component (X'') obtained above, olefin polymers or copolymers can be obtained with a reduced amount of a by-product amorphous polymer in high yields. For example, propylene and another alpha-olefin such as 1-butene are copolymerized by using the above olefin polymerization catalyst, a propylene/1-butene copolymer can be obtained in which the proportion of a component (amorphous polymer) soluble in n-decane at 23° C. is low. A film product prepared from this copolymer has increased anntiblocking property, and the amount of an antiblocking agent such as silica incorporated in the film can be reduced, and the resulting film has excellent transparency.

Since in the present invention, the yield of a polymer having stereoregularity per unit weight of the olefin polymerization catalyst is high, the catalyst residue in the polymer, particularly its halogen content, removing the catalyst from the resulting polymer can be omitted, and in the molding of the resulting olefin polymer, the rusting of the mold can be effectively prevented.

The following examples illustrate the present invention without any intention of limiting the scope of the invention thereby.

EXAMPLE 1

Preparation of a Solid Titanium Catalyst Component (A)

Anhydrous magnesium chloride (7.14 g; 75 millimoles), 37.5 ml of decane and 35.1 ml (225 millimoles) of 2-ehylhexyl alcohol were reacted at 130° C. for 2 hours to form a uniform solution Then, 1.67 g (11.8 millimoles) of phthalic anhydride was added to the solution, and the mixture was further stirred at 130° C. for 1 hour to dissolve phthalic anhydride in the uniform solution.

The resulting uniform solution was cooled to room temperature, and added dropwise in 200 ml (1.8 moles) of titanium tetrachloride kept at −20° C. over 1 hour. After the addition, the temperature of the resulting solution was raised to 110° C. over 4 hours, and when it reached 110° C., 5.03 ml (18.8 millimoles) of diisobutyl phthalate was added.

The solution was further stirred for 2 hours at the above temperature. After the end of the two-hour reaction, the reaction mixture was hot-filtetered to collect a solid portion. The solid portion was resuspended in 275 ml of $TiCl_4$, and again reacted at 110° C. for 2 hours.

After the reaction, the solid portion was collected again by hot filtration, and washed with decane and hexane at 110° C. The washing was continued until no titannium compound was detected in the washings.

The synthesized solid titanium catalyst component (A) was obtained as a hexane slurry. A portion of the catalyst was collected and dried. On analysis, the dried product contained 2.5% by weight of titanium, 58% by weight of chlorine, 18% by weight of magnesium and 13.8% by weight of diisobutyl phthalate.

Preliminary Polymerization

A 400 ml nitrogen-purged glass reactor was charged with 200 ml of purified hexane, 20 millimoles of triethyl aluminum, 4 millimoles of dicyclopentyldimethoxysilane and 2 millimoles, as titanium atom, of the titanium catalyst component (A). Propylene was fed into the reactor at a rate of 5.9 Nl/hour for one hour and polymerized in an amount of 2.8 g per gram of the Ti catalyst component (A).

After the preliminary polymerization, the liquid portion was removed by filtration. The separated solid portion (X') was dispersed in decane.

Oxygen treatment

One millimole as titanium atom of the catalyst (X') subjected to preliminary polymerization was suspended in n-decane to form 100 mg of an n-decane suspension. The suspension was added to a 200 ml catalyst bottle. The suspension was maintained at 25° C. with stirring. From the upper portion of the catalyst bottle, 61 ml of dry air containing 11.2 Nml of oxygen was introduced into the suspension in the bottle by means of a syringe. In 20 minutes after the oxygen introduction, absorbtrion of oxygen ceased. It was found that 5.5 ml of oxygen was absorbed from a burette connected to the catalyst bottle. Thus, a solid titanium catalyst component (X'') treated with oxygen was obtained.

Main polymerization

Sodium chloride (150 g; a special reagent grade purchased from Wako Pure Chemical Industries, Ltd.) was introduced into a 2-liter thoroughly nitrogen-purged stainless steel autoclave, and dried under reduced pressure at 90° C. for 1 hour. Then, the inside of the autoclave was cooled to 65° C., and a mixture of 1 millimole of triethyl aluminum, 0.1 millimole of dicyclohexyldimethoxysilane and 0.01 millimole, as titanium atom, of the solid titanium component (X'') treated with oxygen was introduced into the autoclave. Thereafter, 200 Nml of hydrogen was introduced, and the feeding of a gaseous mixture of propylene and ethylene (92.7/7.3 moles) was started. The total pressure was maintained at 7 $kg/cm^2$-G, the monomeric mixture was polymerized at 70° C. for 1 hour. After the polymerization, sodium chloride was removed by washing with water, and the resulting polymer was washed with methanol and dried overnight at 80° C.

The results are shown in Table 1.

Preparation of a Film

A film was prepared from the polymer by the following procedure and tested for antiblocking property. The results are shown in Table 1.

An aluminum sheet having a thickness of 0.1 mm, a polyester sheet (tradename Lumilar, a product of Toray Inc.) and a polyimide resin (tradename CAPTON, a product of E. I. du Pont de Nemours & Co.) having a thickness of 50 $\mu$m with its center cut off in a 15 cm $\times$ 15 cm square shape were spread in this sequence on a press plate, and 0.8 g of a sample was placed on the center (cut off portion). Then, the polyester sheet, the aluminum sheet and the press plate were further superimposed in this sequence.

The sample held by the press plates was put in a hot press at 200° C., and pre-heated for about 5 minutes. Then, to remove bubbles from the sample, pressurization (20 $kg/cm2$-G) and pressure releasing were repeated three times. And finally, the pressure was elevated to 150 $kg/cm^2$-G, and the sample was heated under pressure for 5 minutes. After releasing the pressure, the press plates were taken out from the press, and transferred to another press in which the press bonding portion was maintained at 30° C. The pres plates were cooled under a pressuree of 100 $kg/cm^2$ for 4 minutes, and after releasing the pressure, the sample was taken out. The resulting film having a uniform thickness of 50 to 70 $\mu$m was used for measurement below.

Test for Antiblocking Property

Two films cut out in a size of 6$\times$10 cm were laid one on top of another, and held by two pieces of paper having a uniform thickness. The assembly was further held by glass sheets having a thickness of about 3 mm. The entire assembly was aged for 2 days in a constant temperature velssel at 60° C. under a load of 7 kg. The films were taken out from the vessel and cooled to room temperature. Part of the end of one of the two superimposed films was removed and a Teflon rod was inserted into it. The removed end of the film was fixed to an upper chuck of a tensile tester by a clip, and simultaneously, the Teflon rod was fixed to a lower chuck via a fixture. The upper chuck was pulled up at a rate of 10 cm/min., and the two films separated from each other via the Teflon rod. The stress generated at this time was measured by the tenstile tester. By dividing the stress by the width (6 cm) of the film used, the blocking value (g/cm) of the film, as a measure of antiblocking property, was determined.

EXAMPLE 2

The following polymerization was performed by using the oxygen-treated catalyst component (X") shown in Example 1.

Main Polymerization

A 2-liter autoclave was charged with 400 g of propylene and 4 Nl of ethylene, and at 55° C., 0.6 millimole of triethyl aluminum, 0.6 millimole of di-n-propyldimethoxysilane and 0.002 millimole, as titanium atom, of the oxygen-treated catalyst component (X"). Hydrogen (1 liter) was further added, and the reaction system was heated to 60° C., and the polymerization was carried out for 30 minutes. Methanol was added to the autoclave to stop the polymerization. The pressure was released, and the resulting polymer was recovered.

The results are shown in Table 1.

EXAMPLE 3

Example 1 was repeated except that a gaseous mixture composed of 90.1 moles of propylene, 4.5 moles of ethylene and 5.4 moles of butene-1 was used instead of the propylene/ethylene gaseous mixture in the main polymerization.

The results are shown in Table 1.

EXAMPLE 4

Preparation of a Solid Titanium Catalyst Component (A)

A 2-liter high-speed stirring device (made by Tokushu Kika Kogyo K. K.) was thoroughly purged with gaseous nitrogen, and 700 ml of purified kerosene, 10 g of commercial $MgCl_2$, 24.2 g of ethanol and 3 g of sorbitan distearate (tradename Emasol 320, a product of Kao-Atlas Co., Ltd.) were put in the stirring device. The system was heated with stirring, and stirred at 800 rpm at 120° C.

Separately, 1 liter of purified kerosene was put in a 2-liter glass flask equipped with a stirrer, and cooled to −10° C.

The purified kerosene containing $MgCl_2$ was transferred by means of a 5 mm Teflon tube to 1 liter of purified kerosene cooled to −10° C.

The resulting solid was collected by filtration, and fully washed with hexane to produce a carrier.

The resulting carrier (7.5 g) was suspended in 150 ml of titanium tetrachloride, and then 1.3 ml of diisobutyl phthalate was added. The mixture was heated to 120° C. and stirred for 2 hours at 120° C. The solid portion was collected by filtration, again suspended in 150 ml of titanium tetrachloride, and again stirred at 130° C. for 2 hours.

The solid reaction product was then collected by filtration, and washed with a sufficient amount of purified hexane to give a solid titanium catalyst component (A).

The resulting solid titanium catalyst component (A) contained 2.1% by weight of titanium, 63% by weight of chlorine, 20% by weight of magnesium and 5.8% by weight of diisobutyl phthalate.

By the same procedure as in Example 1, the titanium catalyst component was treated by preliminary polymerization of propylene and also with oxygen. By using the resulting catalyst, propylene and ethylene were copolymerized as in Example 1. The results are shown in Table 1.

COMPARATIVE EXAMPLE 1

Preparation of a Solid Titanium Catalyst Component (A)

Anhydrous magnesium chloride (7.14 g; 75 millimoles), 37.5 ml of decane and 35.1 ml (225 millimoles) of 2-ethylhexyl alcohol were reacted at 130° C. for 2 hours to form a uniform solution. Then, 1.67 g (11.3 millimoles) of phthalic anhydride was added to the solution, and the mixture was stirred further for 1 hour at 130° C. to dissolve phthalic anhydride in the uniform solution.

The resulting uniform solution was cooled to room temperature, and added dropwise over 1 hour to 200 ml (1.8 moles) of titanium tetrachloride kept at −20° C. After the addition, the temperature of the resulting solution was elevated to 110° C. over 4 hours. When the temperature reached 110° C., 5.03 ml (18.8 millimoles) of diisobutyl phthalate was added.

The mixture was stirred further for 2 hours at the above temperature. After the end of the two-hour reaction, the solid portion was collected by hot filtration. The solid portion was again suspended in 275 ml of $TiCl_4$, and reacted at 110° C. for 2 hours.

After the reaction, the solid portion was collected by hot filtration, and washed with decane and hexane at 110° C. This washing was continued until no titanium compound was detected in the washings.

The synthesized solid titanium catalyst component (A) was obtained as a hexane slurry. A portion of the catalyst was taken and dried. On analysis, the resulting solid titanium catalyst component (A) contained 2.5% by weight of titanium, 58% by weight of chlorine, 18% by weight of magnesium and 13.8% by weight of diisobutyl phthalate.

Preliminary Polymerization

A 400 ml nitrogen-purged glass reactor was charged with 200 ml of purified hexane, 20 millimoles of triethyl aluminum, 4 millimoles of dicyclopentyldimethoxysilane and 2 millimoles, as Ti atom, of the titanium catalyst component (A). Propylene was fed into the reactor at a rate of 5.9 Nl/hour for one hour to polymerize 2.5 g of propylene per gram of the titanium catalyst component (A).

After the preliminary polymerization, the liquid portion was removed by filtration and the separated solid portion (X') was again dispersed in decane.

Main Polymerization

A 2-liter fully nitrogen-purged stainless steel autoclave was charged with 150 g of sodium chloride (special reagent grade, a product of Wako Pure Chemical Industries), and dried at 90° C. under reduced pressure for 1 hour. The system was cooled to 65° C., and a mixture composed of 1 millimole of triethyl aluminum, 0.1 millimole of dicyclohexyldimethoxysilane and 0.01 millimole as titanium atom of the solid titanium catalyst component (X') (treated by preliminary polymerization but not with oxygen) was introduced into the autoclave. Then, 200 Nml of hydrogen was introduced, and the feeding of a gaseous mixture of 92.7 moles of propylene and 7.3 moles of ethylene was started. The total pressure was maintained at 7 kg/cm$^2$-G, and the polymerization was carried out at 70° C. for 1 hour. After the polymerization, sodium chloride was removed by washing with water. The remaining polymer was washed with methanol, and dried overnight at 80° C.
The results are shown in Table 1.

Preparation of a Film

A film was prepared from the polymer as in Example 1, and tested for antiblocking property
The results are shown in Table 1.

COMPARATIVE EXAMPLE 2

The following main polymerization was performed by using the catalyst component (X') shown in Comparative Example 1 which was not treated with oxygen.

Main Polymerization

A 2-liter autoclave was charged with 400 g of propylene and 4 Nl of ethylene, and at 55° C., 0.6 millimole of triethyl aluminum, 0.6 millimole of di-n-proyldimethoxysilane and 0.002 millimole as titanium atom of the titanium catalyst component (X') described in Comparative Example 1 were added. Hydrogen (1 liter) was further added, and the temperature was elevated to 60°.

The polymerization was performed for 30 minutes. The polymerization was stopped by adding methanol to the polymerization reactor. The pressure was released, and the polymer was recovered.

COMPARATIVE EXAMPLE 3

Comparative Example 1 was repeated except that a gaseous mixture of 90.1 moles of propylene, 4.5 moles of ethylene and 5.4 moles of 1-butene was used instead of the gaseous monomeric mixture used in the main polymerization in Comparative Example 1.
The results are shown in Table 1.

COMPARATIVE EXAMPLE 4

Preparation of a solid titanium catalyst component (A)

The same solid titanium catalyst component (A) as obtained in Comparative Example 4 was treated by preliminarily polymerizing propylene in the same way as in Comparative Example 1, but not with oxygen.

Main Polymerization

Propylene and ethylene were copolymerized by using the treated solid titanium catalyst component in the same way as in Comparative Example 1.
The results are shown in Table 1.

EXAMPLE 5

Example 4 was repeated except that the amount of oxygen supplied in the oxygen treatment in Example 4 was changed from 11.2 Nml to 33.6 Nml, and cyclohexylmethyldimethoxysilane was used instead of dicyclohexyldimethoxysilane in the main polymerization.
The results are shown n Table 1.

COMPARATIVE EXAMPLE 5

Example 5 was repeated except that the oxygen treatment was not carried out.
The results are shown in Table 1.
Comparative Examples 1 to 5 correspond to Examples 1 to 5 except that the oxygen treatment was not carried out.

TABLE 1

| Run | Proportions of the monomer units in the copolymer (mole %) | | Melting Point (°C.) | MI (g/10 min.) | Blocking value (g/cm) | Amount yielded (g) | Proportion of a component soluble in n-decane at 23° C. (wt %) |
|---|---|---|---|---|---|---|---|
| | Ethylene | Butene-1 | | | | | |
| Ex. 1 | 6.6 | — | 133 | 3.5 | 1.8 | 56 | 9.2 |
| CEx. 1 | 6.5 | — | 135 | 3.1 | 2.8 | 67 | 10.5 |
| Ex. 2 | 5.7 | — | 135 | 4.7 | 1.5 | 158 | 8.0 |
| CEx. 2 | 5.5 | — | 137 | 4.5 | 2.2 | 173 | 8.5 |
| Ex. 3 | 4.0 | 3.6 | 128 | 4.0 | 1.8 | 61 | 6.7 |
| CEx. 3 | 3.8 | 3.7 | 130 | 4.1 | 2.4 | 70 | 8.2 |
| Ex. 4 | 6.4 | — | 134 | 2.6 | 1.7 | 63 | 8.6 |
| CEx. 4 | 6.4 | — | 136 | 3.0 | 2.5 | 73 | 9.7 |
| Ex. 5 | — | 6.2 | 135 | 2.6 | 1.5 | 52 | 7.9 |
| CEx. 5 | — | 6.3 | 136 | 2.5 | 2.5 | 68 | 9.8 |

Ex. = Example
CEx. = Comparative Example

We claim:
1. A process for copolymerizing a mixture of propylene and ethylene or a mixture of propylene, ethylene and 1-butane which comprises copolymerizing a mixture of propylene and ethylene or a mixture of propylene, ethylene and 1-butene in the presence of an olefin polymerization catalyst formed from
(I) a catalyst component (X") obtained by treating an olefin polymerization catalyst (X) formed from (A) a solid titanium catalyst component prepared from anhydrous magnesium chloride, titanium tetrachloride and diisobutyl phthalate as essential ingredients, (B) triethyl aluminum and, optionally, (C) dicyclopentyldimethoxysilane with propylene by preliminarily polymerizing the propylene in an amount of 0.1 to 500 g per gram of the solid titanium catalyst component (A) in the presence of said catalyst (X), and containing the treated catalyst (X') with at least 0.1 mole, per gram-atom of titanium in the treated catalyst (X'), of oxygen,
(II) an organoaluminum compound catalyst component and, optionally,
(III) an electron donor.

* * * * *